(12) United States Patent
Ramachandran et al.

(10) Patent No.: US 10,353,905 B2
(45) Date of Patent: Jul. 16, 2019

(54) IDENTIFYING ENTITIES IN SEMI-STRUCTURED CONTENT (71) Applicant: salesforce.com, inc., San Francisco, CA (US)

(72) Inventors: Govardana Sachithanandam Ramachandran, Palo Alto, CA (US); Hawro Mustafa, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 611 days.

(21) Appl. No.: 14/695,996

(22) Filed: Apr. 24, 2015

(65) Prior Publication Data
US 2016/0314123 A1 Oct. 27, 2016

(51) Int. Cl.
*G06F 16/2457* (2019.01)
*G06F 17/27* (2006.01)
*G06N 20/00* (2019.01)
*G06N 7/00* (2006.01)
*G06F 16/81* (2019.01)
*G06N 20/20* (2019.01)

(52) U.S. Cl.
CPC ........ *G06F 16/24578* (2019.01); *G06F 16/81* (2019.01); *G06F 17/277* (2013.01); *G06N 7/005* (2013.01); *G06N 20/00* (2019.01); *G06N 20/20* (2019.01)

(58) Field of Classification Search
CPC .......... G06F 17/3053; G06F 16/24578; G06F 17/277
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/998,890.
U.S. Appl. No. 13/986,251.

*Primary Examiner* — Cam Y T Truong (57) ABSTRACT

Identifying entities in semi-structured content is described. A system assigns a corresponding entity type based on a corresponding entity type score for each token in a sequence of tokens in semi-structured content, based on multiple entity types, wherein each token is a corresponding character set. The system assigns a corresponding boundary type based on a corresponding boundary type score for each token in the sequence of tokens, based on a begin boundary type or a continue boundary type. The system identifies an entity based on a corresponding entity type score and a corresponding boundary type for each token in the sequence of tokens. The system outputs the sequence of tokens as an identified set of entities based on the identified entity.

17 Claims, 4 Drawing Sheets

(56) References Cited

U.S. PATENT DOCUMENTS

| | | | |
|---|---|---|---|
| 6,092,083 | A | 7/2000 | Brodersen et al. |
| 6,161,149 | A | 12/2000 | Achacoso et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,135 | B1 | 4/2001 | Brodersen et al. |
| 6,233,617 | B1 | 5/2001 | Rothwein et al. |
| 6,266,669 | B1 | 7/2001 | Brodersen et al. |
| 6,295,530 | B1 | 9/2001 | Ritchie et al. |
| 6,324,568 | B1 | 11/2001 | Diec et al. |
| 6,324,693 | B1 | 11/2001 | Brodersen et al. |
| 6,336,137 | B1 | 1/2002 | Lee et al. |
| D454,139 | S | 3/2002 | Feldcamp et al. |
| 6,367,077 | B1 | 4/2002 | Brodersen et al. |
| 6,393,605 | B1 | 5/2002 | Loomans |
| 6,405,220 | B1 | 6/2002 | Brodersen et al. |
| 6,434,550 | B1 | 8/2002 | Warner et al. |
| 6,446,089 | B1 | 9/2002 | Brodersen et al. |
| 6,535,909 | B1 | 3/2003 | Rust |
| 6,549,908 | B1 | 4/2003 | Loomans |
| 6,553,563 | B2 | 4/2003 | Ambrose et al. |
| 6,560,461 | B1 | 5/2003 | Fomukong et al. |
| 6,574,635 | B2 | 6/2003 | Stauber et al. |
| 6,577,726 | B1 | 6/2003 | Huang et al. |
| 6,601,087 | B1 | 7/2003 | Zhu |
| 6,604,117 | B2 | 8/2003 | Lim et al. |
| 6,604,128 | B2 | 8/2003 | Diec |
| 6,609,150 | B2 | 8/2003 | Lee et al. |
| 6,621,834 | B1 | 9/2003 | Scherpbier |
| 6,654,032 | B1 | 11/2003 | Zhu |
| 6,665,648 | B2 | 12/2003 | Brodersen et al. |
| 6,665,655 | B1 | 12/2003 | Warner et al. |
| 6,684,438 | B2 | 2/2004 | Brodersen et al. |
| 6,711,565 | B1 | 3/2004 | Subramaniam et al. |
| 6,724,399 | B1 | 4/2004 | Katchour et al. |
| 6,728,702 | B1 | 4/2004 | Subramaniam et al. |
| 6,728,960 | B1 | 4/2004 | Loomans et al. |
| 6,732,095 | B1 | 5/2004 | Warshavsky et al. |
| 6,732,100 | B1 | 5/2004 | Brodersen et al. |
| 6,732,111 | B2 | 5/2004 | Brodersen et al. |
| 6,754,681 | B2 | 6/2004 | Brodersen et al. |
| 6,763,351 | B1 | 7/2004 | Subramaniam et al. |
| 6,763,501 | B1 | 7/2004 | Zhu |
| 6,768,904 | B2 | 7/2004 | Kim |
| 6,772,229 | B1 | 8/2004 | Achacoso et al. |
| 6,782,383 | B2 | 8/2004 | Subramaniam et al. |
| 6,785,651 | B1 * | 8/2004 | Wang ............... G06F 9/4446 379/88.01 |
| 6,804,330 | B1 | 10/2004 | Jones et al. |
| 6,826,565 | B2 | 11/2004 | Ritchie et al. |
| 6,826,582 | B1 | 11/2004 | Chatterjee et al. |
| 6,826,745 | B2 | 11/2004 | Coker |
| 6,829,655 | B1 | 12/2004 | Huang et al. |
| 6,842,748 | B1 | 1/2005 | Warner et al. |
| 6,850,895 | B2 | 2/2005 | Brodersen et al. |
| 6,850,949 | B2 | 2/2005 | Warner et al. |
| 7,062,502 | B1 | 6/2006 | Kesler |
| 7,340,411 | B2 | 3/2008 | Cook |
| 7,356,482 | B2 | 4/2008 | Frankland et al. |
| 7,401,094 | B1 | 7/2008 | Kesler |
| 7,620,655 | B2 | 11/2009 | Larsson |
| 7,698,160 | B2 | 4/2010 | Beaven et al. |
| 7,779,475 | B2 | 8/2010 | Jakobson et al. |
| 7,851,004 | B2 | 12/2010 | Hirao et al. |
| 8,010,663 | B2 | 8/2011 | Firminger et al. |
| 8,014,943 | B2 | 9/2011 | Jakobson |
| 8,015,495 | B2 | 9/2011 | Achacoso et al. |
| 8,032,297 | B2 | 10/2011 | Jakobson |
| 8,082,301 | B2 | 12/2011 | Ahlgren et al. |
| 8,095,413 | B1 | 1/2012 | Beaven et al. |
| 8,095,594 | B2 | 1/2012 | Beaven et al. |
| 8,209,308 | B2 | 6/2012 | Jakobson et al. |
| 8,275,836 | B2 | 9/2012 | Beaven et al. |
| 8,484,111 | B2 | 7/2013 | Frankland et al. |
| 8,490,025 | B2 | 7/2013 | Jakobson et al. |
| 8,504,945 | B2 | 8/2013 | Jakobson et al. |
| 8,510,664 | B2 | 8/2013 | Rueben et al. |
| 8,566,301 | B2 | 10/2013 | Rueben et al. |
| 8,646,103 | B2 | 2/2014 | Jakobson et al. |
| 8,868,409 | B1 * | 10/2014 | Mengibar ............ G10L 15/26 704/10 |
| 9,047,283 | B1 * | 6/2015 | Zhang ............ G06F 17/30663 |
| 2001/0044791 | A1 | 11/2001 | Richter et al. |
| 2002/0072951 | A1 | 6/2002 | Lee et al. |
| 2002/0082892 | A1 | 6/2002 | Raffel |
| 2002/0129352 | A1 | 9/2002 | Brodersen et al. |
| 2002/0140731 | A1 | 10/2002 | Subramanian et al. |
| 2002/0143997 | A1 | 10/2002 | Huang et al. |
| 2002/0162090 | A1 | 10/2002 | Parnell et al. |
| 2002/0165742 | A1 | 11/2002 | Robbins |
| 2003/0004971 | A1 | 1/2003 | Gong |
| 2003/0018705 | A1 | 1/2003 | Chen et al. |
| 2003/0018830 | A1 | 1/2003 | Chen et al. |
| 2003/0066031 | A1 | 4/2003 | Laane et al. |
| 2003/0066032 | A1 | 4/2003 | Ramachandran et al. |
| 2003/0069936 | A1 | 4/2003 | Warner et al. |
| 2003/0070000 | A1 | 4/2003 | Coker et al. |
| 2003/0070004 | A1 | 4/2003 | Mukundan et al. |
| 2003/0070005 | A1 | 4/2003 | Mukundan et al. |
| 2003/0074418 | A1 | 4/2003 | Coker et al. |
| 2003/0120675 | A1 | 6/2003 | Stauber et al. |
| 2003/0151633 | A1 | 8/2003 | George et al. |
| 2003/0159136 | A1 | 8/2003 | Huang et al. |
| 2003/0187642 | A1 * | 10/2003 | Ponceleon .......... G10L 15/1822 704/252 |
| 2003/0187921 | A1 | 10/2003 | Diec et al. |
| 2003/0189600 | A1 | 10/2003 | Gune et al. |
| 2003/0204427 | A1 | 10/2003 | Gune et al. |
| 2003/0206192 | A1 | 11/2003 | Chen et al. |
| 2004/0001092 | A1 | 1/2004 | Rothwein et al. |
| 2004/0015981 | A1 | 1/2004 | Coker et al. |
| 2004/0027388 | A1 | 2/2004 | Berg et al. |
| 2004/0128001 | A1 | 7/2004 | Levin et al. |
| 2004/0186860 | A1 | 9/2004 | Lee et al. |
| 2004/0193510 | A1 | 9/2004 | Catahan et al. |
| 2004/0199489 | A1 | 10/2004 | Barnes-Leon et al. |
| 2004/0199536 | A1 | 10/2004 | Barnes-Leon et al. |
| 2004/0249854 | A1 | 12/2004 | Barnes-Leon et al. |
| 2004/0260534 | A1 | 12/2004 | Pak et al. |
| 2004/0260659 | A1 | 12/2004 | Chan et al. |
| 2004/0268299 | A1 | 12/2004 | Lei et al. |
| 2005/0050555 | A1 | 3/2005 | Exley et al. |
| 2005/0091098 | A1 | 4/2005 | Brodersen et al. |
| 2008/0120129 | A1 * | 5/2008 | Seubert ............... G06Q 10/06 705/35 |
| 2009/0063415 | A1 | 3/2009 | Chatfield et al. |
| 2009/0100342 | A1 | 4/2009 | Rueben et al. |
| 2009/0177744 | A1 | 7/2009 | Marlow et al. |
| 2011/0066585 | A1 * | 3/2011 | Subrahmanyam ...... G06N 7/005 706/52 |
| 2012/0233137 | A1 | 9/2012 | Jakobson et al. |
| 2012/0317098 | A1 * | 12/2012 | Okato ............ G06F 17/30613 707/722 |
| 2013/0218948 | A1 | 8/2013 | Jakobson |
| 2013/0218949 | A1 | 8/2013 | Jakobson |
| 2013/0218966 | A1 | 8/2013 | Jakobson |
| 2014/0359537 | A1 | 12/2014 | Jakobson et al. |
| 2015/0007050 | A1 | 1/2015 | Jakobson et al. |
| 2015/0032829 | A1 * | 1/2015 | Barshow ............... H04L 51/16 709/206 |
| 2015/0095162 | A1 | 4/2015 | Jakobson et al. |
| 2016/0026621 | A1 * | 1/2016 | Misra ............... G06F 17/2785 704/9 |

\* cited by examiner

FIG. 1

| Token | John | York | Executive | Assistant | New | York | Club | 201 | Goodwin | Ave | jyork@newyorkclub.com | 212.202.8318 | Ext. | 961 |
|---|---|---|---|---|---|---|---|---|---|---|---|---|---|---|
| Layer 1 | 0.9 first name | 0.5 Last name | 0.9 title | 0.9 title | 0.4 city | 0.4 city | 0.9 company | 1.0 address | 0.3 last name | 1.0 address | 0.5 email | 0.5 phone | 0.5 phone | 0.5 address |
| Layer 2 | | | | | | | | | | | 1.0 email | 1.0 phone | 1.0 phone | |
| Layer 3 | 1.0 begin | 0.9 begin | 0.9 begin | 0.9 continue | 0.9 begin | 0.5 continue | 0.9 continue | 1.0 begin | 0.5 continue | 0.7 continue | 1.0 begin | 1.0 begin | 0.9 continue | 0.6 continue |
| Layer 4 | 0.9 first name | 0.5 last name | 1.8 title | | 0.9 company | | | 2.0 address | | 2.0 email | | 1.0 phone | | |

IDENTIFYING ENTITIES IN SEMI-STRUCTURED CONTENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Although an entity identifier may be able to identify entities in content that is unstructured, such as properly framed sentences, the entity identifier may not be able to accurately identify entities in semi-structured content, such as an email signature block or a social network profile. For example, an email signature block may appear as follows:

John York, Executive Assistant New York Club
201 Goodwin Ave., New York, N.Y. 10018
jyork@newyorkclub.com    212.202.8313    Ext.    961
www.newyorkclub.com An entity identifier should recognize that John is a first name, York is a last name, Executive Assistant is a title, New York Club is a company, 201 Goodwin Ave., New York, N.Y. 10018 is a street address, jyork@new yorkclub.com is an email address, 212.202.8313 ext. 961 is a work phone number, and www.newyorkclub.com is a website. An entity identifier should function similarly for email signature blocks that are formatted differently.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for identifying entities in semi-structured content. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system. Next, mechanisms and methods for identifying entities in semi-structured content will be described with reference to example embodiments. The following detailed description will first describe a method for identifying entities in semi-structured content. Next, an example table of classification levels for identifying entities in semi-structured content is described.

In accordance with embodiments described herein, there are provided systems and methods for identifying entities in semi-structured content. A corresponding entity type based on a corresponding entity type score is assigned to each token in a sequence of tokens in semi-structured content, based on multiple entity types, wherein each token is a corresponding character set. A corresponding boundary type based on a corresponding boundary type score is assigned to each token in the sequence of tokens, based on a begin boundary type or a continue boundary type. An entity is identified based on a corresponding entity type score and a corresponding boundary type for each token in the sequence of tokens. The sequence of tokens is output as an identified set of entities based on the identified entity.

For example, a system scores tokens from an email signature block, including the scoring of the token "John" with a 0.9 first name entity type, the token "York" with a 0.5 last name entity type, the token "201" with a 1.0 address entity type, the token "Goodwin" with a 0.3 last name entity type, and the token "Ave." with a 1.0 address entity type. Then the system scores the token "John" with a 1.0 begin boundary type, the token "York" with a 0.9 begin boundary type, the token "201" with a 1.0 begin boundary type, the token "Goodwin" with a 0.5 continue boundary type, and the token "Ave." with a 0.7 continue boundary type. The system identifies "201 Goodwin Ave." as an address for a person named John York because the relatively high score of the continue boundary type for the token "Goodwin" enabled the system to identify the token "Goodwin" as a continuation of the preceding address entity type for the preceding token "201," taking into account the relatively low score from initially identifying the token "Goodwin" as likely being a last name entity type. Then the system outputs 201 Goodwin Ave. as the street address for a person named John York.

While one or more implementations and techniques are described with reference to an embodiment in which identifying entities in semi-structured content is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the embodiments described herein may be used alone or together with one another in any combination. The one or more implementations encompassed within this specification may also include embodiments that are only partially mentioned or alluded to or are not mentioned or alluded to at all in this brief summary or in the abstract.

Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

As described below, the database system which includes an ensemble machine learning model divides the process of identifying entities in semi-structured content into layers of classifications. For a given sequence of observed tokens $X=x_1, \ldots x_n$, the machine learning model predicts labels for compound sequence $Y=y_1 \ldots y_m$. Instead of directly modeling $P(Y|X)$, the machine learning model uses layers to predict the latent variable H in each layer of classification. Based on the chain rule of probability, the equation is:

$$P(y|x, \theta) = \sum_h P(y|h, x, \theta) P(h|x, \theta).$$

The latent variable H is what is predicted at each layer of classification by the corresponding classifier.

Figure 1:
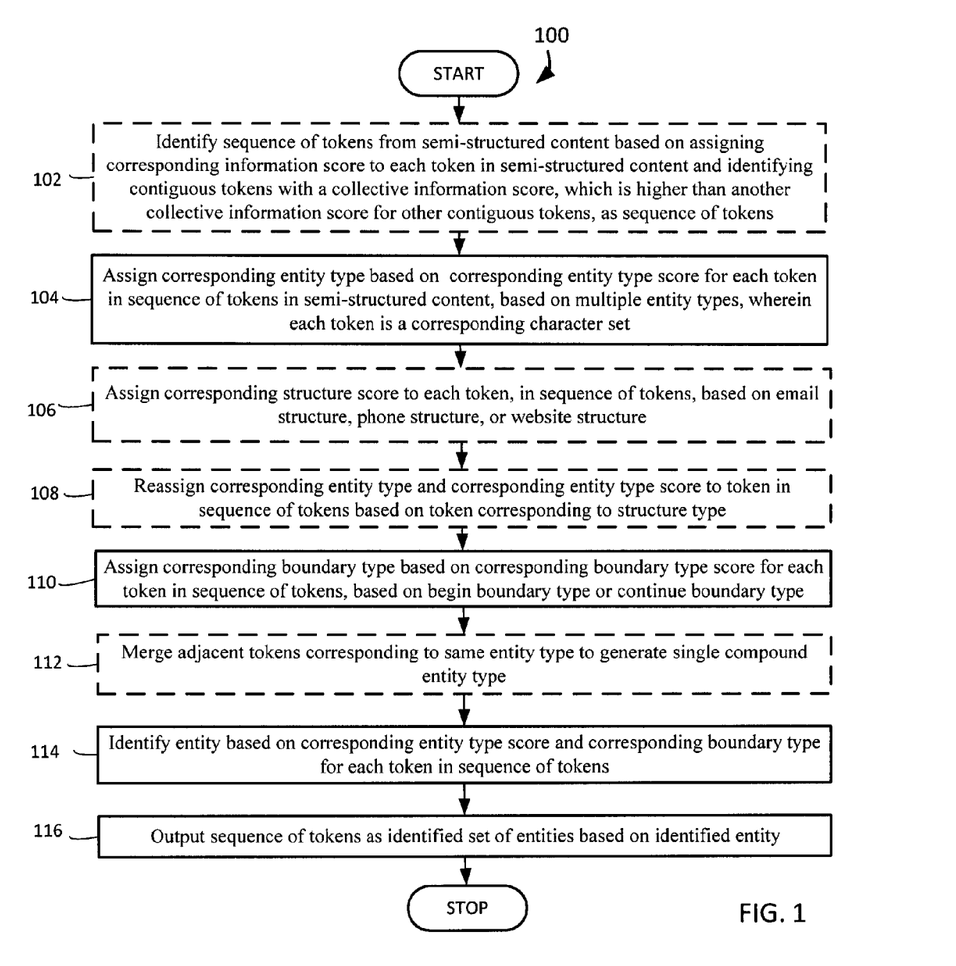
FIG. 1 is an operational flow diagram illustrating a high level overview of a method for identifying entities in semi-structured content, in an embodiment.

FIG. 1 is an operational flow diagram illustrating a high level overview of a method 100 for identifying entities in semi-structured content. As shown in FIG. 1, an ensemble machine learning model may identify entities in semi-structured content.

The machine learning model optionally identifies a sequence of tokens in semi-structured content based on assigning a corresponding information score to each token in the semi-structured content and identifying contiguous tokens with collective information scores, which is higher than another collective information score for other contiguous tokens, as the sequence of tokens, block 102. For example and without limitation, this can include the machine learning model using a Naive Bayes classifier to assign a corresponding information score to each token in the following email:

Hi team,
Please update your profiles with the training which you have taken this year. We just need the course name and the date you took the training. Please complete this by Thursday.
Thanks,
John York, Executive Assistant New York Club
201 Goodwin Ave., New York, N.Y. 10018
jyork@newyorkclub.com   212.202.8313   Ext.   961
www.newyorkclub.com Continuing this example, the machine learning model uses a density based clustering model to identify the contiguous tokens beginning with the token "John" and ending with the token "www.newyorkclub.com" as region of higher information density than the contiguous tokens beginning with the token "Hi" and ending with the token "Thanks." Based on the higher information density, the machine learning model identifies the contiguous tokens beginning with the token "John" and ending with the token "www.newyorkclub.com" as a sequence of tokens from which entities are to be identified. The capability to identify specific sequences of tokens which are more likely to include contact entities enables the machine learning model to parse semi-structured content such as entire web pages to identify contact entities. Since some websites for email profiles and social network profiles may use a very specific local structure, the machine learning model may improve precision and recall by adding popular domain and path regular expressions as features in each layer of classification.

The machine learning model may use a Stanford-Core Natural Language Processor to tokenize the semi-structured content due to the capability to tokenize around entities such as phone numbers, email addresses, and websites and process these entities as a whole instead of processing the entities' component parts, even if these entities have an embedded space or punctuation.

Having identified the sequence of tokens, the first layer of machine learning model—Latent Dynamic Conditional Random Field, assigns a corresponding entity type based on a corresponding entity type score for each token in the sequence of tokens in semi-structured content, based on multiple entity types, wherein each token is corresponding character set, block 104. By way of example and without limitation, this can include the machine learning model predicting the entity type that best describes each token based on the entity type that has scored the highest Posterior for the token from an email signature block, including the scoring of the token "John" with a posterior of 0.9 for first name entity type, the token "York" with a posterior of 0.5 for last name entity type, the token "Executive" with a posterior of 0.9 for title entity type, the token "Assistant" with a posterior of 0.9 for title entity type, the token "New" with a posterior of 0.4 for city entity type, the token "York" with a posterior of 0.4 for city entity type, and the token "Club" with a posterior of 0.9 for company entity type. Continuing the example, the machine learning model scores the token "201" with a posterior 1.0 for address entity type, the token "Goodwin" with a posterior 0.3 for last name entity type, the token "Ave." with a posterior 1.0 for address entity type, the token jyork@newyorkclub.com with a posterior 0.5 for email entity type, the token "212.202.8313" with a posterior 0.5 phone entity type, the token "Ext." with a posterior 0.5 for phone entity type, the token "961" with a posterior 0.5 for address entity type, and the token "www.newyorkclub.com" with a posterior 0.5 for website entity type.

Although the foregoing example depicts entity type with posterior scores with values that range from 0.0 to 1.0 and depicts entity types as first name, last name, title, company, address, city, state, email address, phone number, and website; the entity type may be any other type, such as country, new line, punctuation, letter, number, other character, or ambiguous. The machine learning model determines the posterior for an entity type for a token to reflect a level of confidence that the machine learning model assigned the correct entity type, based on training data set.

This initial processing of tokens in the semi-structured content may be executed by the first layer of classification, which may be referred to as the latent dynamic conditional relation field. The first layer of classification classifies the finer substructure, or token, within a compound entity based on descriptive features, such as entity type, and contextual features. Other examples of descriptive features include whether a token is all capital letters, starts with a capital letter, starts a new line, is an abbreviation, is a single character, has punctuation before the token, has punctuation after the token, has punctuation one token before the token, has punctuation one token after the token, etc. The first layer also uses parts of speech to identify entity types, such as adjective-noun for the tokens "Vice President," noun-noun for the tokens "Account Executive," and verb-noun for the tokens "Recruiting Coordinator." More descriptive features include use of a Naive Bayes Classifier build on a Jigsaw® database, use of cosine similarity score between tokens and email prefixes, email domains and website domains. Email prefixes have high similarities with first and last names, while companies have high similarities with email and website domains. More descriptive features include are: is the token an abbreviation, is the token an email or phone number or website etc. For contextual features, the model uses second order Markovian, where in it uses the descriptive features of its two immediate neighbors on either side, and the token just before next punctuation, which provides context in which a token appears.

The first line of an email signature block has a strong bias towards particular entity types. For example, a person's name appears the vast majority of the time on the first line. Line-specific effects may not be modeled for other lines in an email signature block because there is significantly more variability on which entity types occur in which lines on lines other than the first line. For example, an email address may appear on the second line of an email signature block, the third line, or may be entirely absent. In view of this insight about other lines, not only is it merely unnecessary to model line-specific effects, it may be better to not do so.

In another example, the machine learning model may identify the first three tokens from each of the token sequences "John F. Kennedy MD," "John F. Kennedy St.," and "John F. Kennedy Inc." as a first name token, and a last name token, but the machine leaning model uses the last tokens in each token sequence, "MD," "St.," and "Inc." to identify the preceding three tokens as a person entity type, and address entity type, and a company entity type, respectively.

While a human may annotate a training example of the compound entity "New York" as a city or a state, the machine learning model may not be trained on the latent or intrinsic state of the individual component token "York." Therefore, the first layer of classification assigns an entity type to a token based on the different identities of the token based on the different contexts it may appear which it has inferred from the training set.

Actual signature
Jake Levine
VP Product, Yesware
www.yesware.com
Human annotate signature
  [Jake]/first_name [Levine]/last_name
  [VP Product]/title, [Yesware]/company
  [www.yesware.com]/other Having identified entity types, the ensemble machine learning model optionally assigns a corresponding structure score to each token, in the sequence of tokens, based on an email structure, a phone structure, or a website structure, block 106. In embodiments, this can include the model identifying tokens that matches pre-defined structures and a corresponding structure confidence score, such as identifying the token "jyork@newyorkclub.com" as an email entity structure and boosting the previously assigned email entity type score for the token "jyork@newyorkclub.com" from 0.5 to 1.0, identifying the token "212.202.8313" as a phone entity structure and boosting the previously assigned phone entity type score for the token "212.202.8313" from 0.5 to 1.0, and identifying the token "www.newyorkclub.com" as a website entity structure and boosting the previously assigned website entity type score for the token "www.newyorkclub.com" from 0.5 to 1.0.

Although this example depicts tokens with structure confidence scores with values of 1.0; this confidence score may have any value. The latent insight model assigns an entity type score, or boosts a corresponding entity type score for a token that has a known structure, to reflect a level of confidence the latent insight model has about the structure of the token.

This process of identifying a token that has a structure in the semi-structured content may be executed by the second layer of classification, which may be referred to as the latent insight model. The second layer of classification classifies tokens based on their structure, which may enable more accurate and/or more confident identifications of email addresses, phone numbers, and websites than the identifications of these types made by the first layer of classification, the latent dynamic conditional relation field. In addition to boosting the entity type scores for tokens, the second layer's identification of a token as a structure type may enable corrections when tokens are misidentified by the first layer.

The second layer may use a combination of rules and logic, which may be in the form of regular expression to identify structure types. A rule may identify a token as a phone number by looking up numerous patterns for a phone number. For example, a token "(903) 834 2345." The latent insight model identifies the token:

|  | (903) | 834 | 2345 |
|---|---|---|---|
| as phone entity type | (3d) | 3d | 4d |

Here a phone entity type is recognized, if the token matches any of the known formats for a phone number. Here 3d and 4d denotes a string of 3 digits and 4 digits, respectively, and are recognized by regular expressions.

Having optionally identified an entity that has inherent structure, the latent insight model optionally reassigns a corresponding entity type and a corresponding entity type score to a token in the sequence of tokens based on the token corresponding to a structure type, block 108. For example and without limitation, this can include the latent dynamic conditional random field reassigning a corresponding entity type and a corresponding confidence score to a token that matches a known structure, such as reassigning the token "212.202.8318" as a phone entity type with relatively low posterior of 0.5, since phone numbers have a specific structure, thereby correcting the previous erroneous assignment of "212.202.8318" as a address entity type based on a similarity to a specific extended zip code number.

Having identified entity types of the intrinsic entity type and having optionally identified structure scores, the ensemble machine learning model assigns a corresponding boundary type based on a corresponding boundary type score for each token in the sequence of tokens, based on two boundary types: a begin boundary type or a continue boundary type, block 110. By way of example and without limitation, this can include the machine learning model predicting the token "John" with a posterior 1.0 for begin boundary type, the token "York" with a posterior 0.9 with begin boundary type, the token "Executive" with a posterior 0.9 for begin boundary type, the token "Assistant" with a posterior 0.9 for continue boundary type, the token "New" with a posterior 0.9 for begin boundary type, the token "York" with a posterior 0.5 for continue boundary type, and the token "Club" with a posterior 0.9 for continue boundary type. Continuing the example, the machine learning model scores the token "201" with a posterior 1.0 for begin boundary type, the token "Goodwin" with a posterior 0.5 with continue boundary type, the token "Avenue" with a posterior 0.7 for continue boundary type, the token jyork@newyorkclub.com with a posterior 1.0 for begin boundary type, the token "212.202.8313" with a posterior 1.0 with begin boundary type, the token "Ext." with a posterior 0.9 with continue boundary type, the token "961" with a posterior 0.6 with continue boundary type, and the token "www.newyorkclub.com" with a posterior 1.0 with begin boundary type. Although this example depicts boundary type scores with values ranging from 0.5 to 1.0; the boundary type score may have any values. The machine learning model predicts a score for a token to reflect a level of confidence that the machine learning model assigned the correct boundary type, based on inferences of the training data set.

This processing of token sequence boundaries in the semi-structured content may be executed by the third layer of classification, which may be referred to as the shallow parsing conditional relation field. The third layer of classification identifies where a compound entity begins and ends using only two boundary types, a begin boundary type and a continue boundary type. The third layer does not need an end boundary type because each begin boundary type implicitly identifies the previous boundary as having ended. For example, when the machine learning model scores the token "201" with a relatively high posterior 1.0 for begin boundary type, the machine learning model identifies that the boundary for the preceding token sequence which includes the token "Club" is ended. Similar to the first layer, the third layer of classification may base identification of boundaries on descriptive features, such as whether a token is all capital letters, starts with a capital letter, starts a new line, is an abbreviation, is a single character, has punctuation before the token, has punctuation after the token, has punctuation one token before the token, has punctuation one token after the token, etc.

The machine learning model may merge adjacent tokens corresponding to the same entity type to generate a single compound entity type, block 112. For example, the machine learning model merges the title entity tokens "Executive" and "Assistant" to produce the single title entity token of "Executive Assistant." The machine learning may complement entity merging rules with some simple logic to concisely cover many cases which would individually require different rules for adjacent words that may need to be merged. This logic based on the sequence of intrinsic entities may constitute to one single compound entity that was inferred during model training. This may include "if a token sequence contains a subsequence of contiguous entities which are all the same entity type or commas, then merge the subsequence into a compound entity of the same type." This logic may be especially useful for merging title and company name entities. For example:

| John | York | Executive | Assistant |
|---|---|---|---|
| first_name | last_name | title | title |

The above-described logic merges the two title tokens into one title token. That is, the logic produces the transformed results:

| John | York | Executive Assistant |
|---|---|---|
| first_name | last_name | title. |

The ensemble machine learning model identifies an entity based on a corresponding entity type score and a corresponding boundary type for each token in the sequence of tokens, block 114. By way of example and without limitation, this can include the machine learning model identifying ""New York Club," as an company because the continue boundary type for the token "Club" enabled the machine learning model to identify the token "Club" as a continuation of the preceding entities "New York," taking into account the relatively low scores of 0.4 for initially identifying each of the tokens "New York" as likely being a city entity type and the relatively high score of 0.9 identifying the token "Club" as a company entity type. In yet another example, the machine learning model identifies"201 Goodwin Ave," as an address because the continue boundary type for the token "Goodwin" enabled the machine learning to identify the token "Goodwin" as a continuation of the preceding entity type address for the preceding token "201," taking into account the relatively low score of 0.3 for initially identifying the token "Goodwin" as likely being a last name entity type.

In a further example, the machine learning model identifies"212.202.8313 Ext.961" as a phone number because the continue boundary type for the token "961" enabled the machine learning model to identify the token "961" as a continuation of the preceding entity type phone number for the preceding tokens "212.202.8313 Ext," taking into account the relatively low score of 0.5 for identifying the token "961" as likely being an address entity type, for which a begin boundary type would have been expected.

This final processing of tokens in the semi-structured content may be executed by the fourth layer of classification, which may be referred to as the maximum a posteriori probability compound sequence labeling. The fourth layer of classification identifies entities based on the processing by the first three layers of classification. From the set of identified entity types for a token, or a sequence of tokens that constitutes the compound entity, the entity type that maximizes the overall compound sequence posteriori score for the token, or the sequence of tokens, is the entity type for compound sequence of token. Here scores are represented in un-normalized form for ease of computation Examples of compound sequence posteriori scores for tokens are described below in reference to FIG. 2. The identified entities may be from the same line of the semi-structured content. For example, the machine learning model identifies both the title "Executive Assistant" and the company "New York Club" as compound entities identified by combining multiple tokens from the first line of the email signature block.

The ensemble machine learning model may use a positional feature to qualify entity types. After initially assigning an intrinsic entity type and an confidence score to each token, the machine learning model may identify a token sequence as corresponding to an entity type assigned to the last token of the token sequence. For example, the machine learning model identifies the token sequence "New York Club" as corresponding to the company entity type initially identified for the last token "Club" despite the initial identification of the tokens "New" and "York" as city entity types.

Recognition of the various entities that might appear in semi-structured content may use a large training set generated from a limited number of seed email signatures. The seed email signatures is used to capture localized structures and valid contacts from countries which contribute the majority of the content in a specific language, such as the United States, the United Kingdom, Australia, New Zealand, Ireland, and India for English. Alternatively, recognition of the various entities that might appear in semi-structured content may use a large and diverse training set of person first and last names, of job titles, of company names, and more. Such a training set may be readily available from a contacts database, such as the Jigsaw® database. This form of generating numerous email signature from a limited set of email signature may be referred to as synthetic email signature.

Having identified at least one entity, the ensemble machine learning model outputs the sequence of tokens as an identified set of entities based on the identified at least one entity, block 116. In embodiments, this can include the ensemble machine learning model outputting John York as a person's name, Executive Assistant as John's work title, New York Club as John's employer, 201 Goodwin Ave., New York, N.Y. 10018 as John's work address, jyork@newyorkclub.com as John's work email address, 212.202.8313 ext. 961 as John's work phone, and www.newyorkclub.com as John's work website.

The method 100 may be repeated as desired. Although this disclosure describes the blocks 102-116 executing in a particular order, the blocks 102-116 may be executed in a different order. In other implementations, each of the blocks 102-116 may also be executed in combination with other blocks and/or some blocks may be divided into a different set of blocks.

Figure 2:
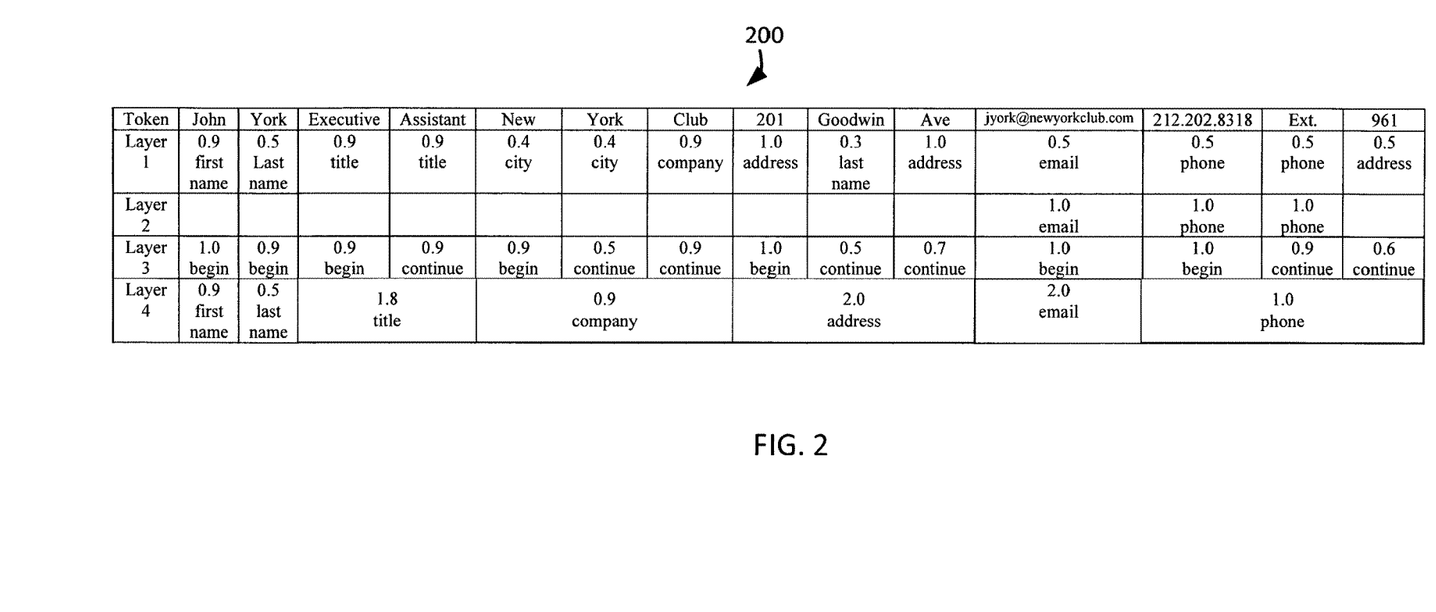
FIG. 2 illustrates an example table of classification levels for identifying entities in semi-structured content, in an embodiment.

FIG. 2 illustrates an example table of classification levels for identifying entities in semi-structured content, under an embodiment. Table 200 includes rows for layer 1, which is the latent dynamic conditional random field model, rows for layer 2, which is the latent insight model, rows for layer 3, which is the shallow parsing conditional relation field model, and rows for layer 4, which is the maximum a posteriori probability compound sequence labeling; and columns for the tokens in the ongoing example. The layer 1 row includes the example entity types and entity type posterior scores described above in reference to block 104. The layer 2 row includes the example structure type scores described above in reference to block 106. The layer 3 row includes the example boundary types and boundary type posterior scores described above in reference to block 110. The layer 4 row includes the example entities described above in reference to block 114 and entity scores, or compound sequence maximum a posteriori scores. For example, the column for the token "John" indicates that layer 1 predicts the intrinsic entity type as first name with posterior 0.9, layer 2 assigned nothing because the token "John" does not match any structure type, layer 3 predicts the boundary type as begin with posterior 1.0, and layer 4 classifies the compound entity with inputs from layers 1 through 3 to classify the compound entity as entity type first name with un-normalized posteriori of 0.9 for the token "John."

Another example in the table 200 indicates how layer 1 classifies tokens "New" and "York" as intrinsic entity types as city with both with posterior 0.4. The layer 3 classifies the token "New" as begin boundary type with posterior 0.9, "York" as a continue boundary type with posterior 0.5, and "Club" as a continue boundary type with posterior 0.9. The layer 4 then predicts the compound entity "New York Club" of type company with un-normalized maximum a posterior of 0.9. Although this example depicts layer 4 assigning compound sequence un-normalized posteriori in the range from 0.5 to 1.8; the compound sequence posteriori type scores may have any value, and may be calculated based on any combination of the entity type scores, the structure type scores, and the boundary type scores. The table 200 does not include a column for the token "www.newyorkclub.com" because some contact entity identifiers do not extract website entity types from semi-structured content other than the extraction of content from website domains for temporary use in assisting in the identification of a company entity.

System Overview

Figure 3:
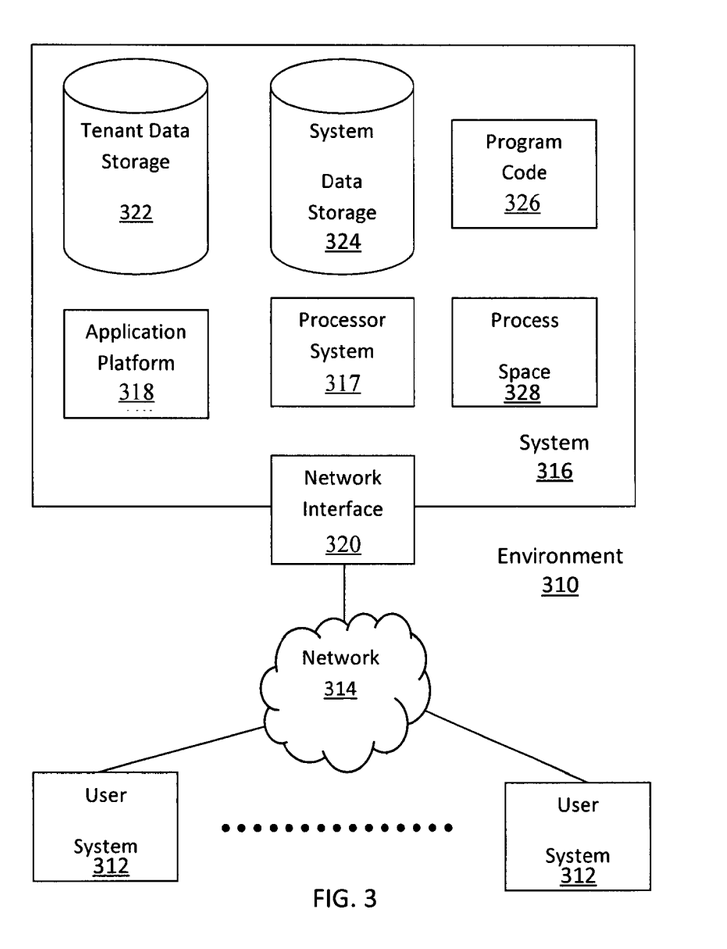
FIG. 3 illustrates a block diagram of an example of an environment wherein an on-demand database service might be used.

FIG. 3 illustrates a block diagram of an environment 310 wherein an on-demand database service might be used. The environment 310 may include user systems 312, a network 314, a system 316, a processor system 317, an application platform 318, a network interface 320, a tenant data storage 322, a system data storage 324, program code 326, and a process space 328. In other embodiments, the environment 310 may not have all of the components listed and/or may have other elements instead of, or in addition to, those listed above.

The environment 310 is an environment in which an on-demand database service exists. A user system 312 may be any machine or system that is used by a user to access a database user system. For example, any of the user systems 312 may be a handheld computing device, a mobile phone, a laptop computer, a work station, and/or a network of computing devices. As illustrated in FIG. 3 (and in more detail in FIG. 4) the user systems 312 might interact via the network 314 with an on-demand database service, which is the system 316.

An on-demand database service, such as the system 316, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, the "on-demand database service 316" and the "system 316" will be used interchangeably herein. A database image may include one or more database objects. A relational database management system (RDMS) or the equivalent may execute storage and retrieval of information against the database object(s). The application platform 318 may be a framework that allows the applications of the system 316 to run, such as the hardware and/or software, e.g., the operating system. In an embodiment, the on-demand database service 316 may include the application platform 318 which enables creation, managing and executing one or more applications developed by the provider of the on-demand database service, users accessing the on-demand database service via user systems 312, or third party application developers accessing the on-demand database service via the user systems 312.

The users of the user systems 312 may differ in their respective capacities, and the capacity of a particular user system 312 might be entirely determined by permissions (permission levels) for the current user. For example, where a salesperson is using a particular user system 312 to interact with the system 316, that user system 312 has the capacities allotted to that salesperson. However, while an administrator is using that user system 312 to interact with the system 316, that user system 312 has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

The network 314 is any network or combination of networks of devices that communicate with one another. For example, the network 314 may be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

The user systems 312 might communicate with the system 316 using TCP/IP and, at a higher network level, use other common Internet protocols to communicate, such as HTTP, FTP, AFS, WAP, etc. In an example where HTTP is used, the user systems 312 might include an HTTP client commonly referred to as a "browser" for sending and receiving HTTP messages to and from an HTTP server at the system 316. Such an HTTP server might be implemented as the sole network interface between the system 316 and the network 314, but other techniques might be used as well or instead. In some implementations, the interface between the system 316 and the network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, the system 316, shown in FIG. 3, implements a web-based customer relationship management (CRM) system. For example, in one embodiment, the system 316 includes application servers configured to implement and execute CRM software applications as well as provide related data, code, forms, webpages and other information to and from the user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, the system 316 implements applications other than, or in addition to, a CRM application. For example, the system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of the system 316 is shown in FIG. 3, including the network interface 320, the application platform 318, the tenant data storage 322 for tenant data 323, the system data storage 324 for system data 325 accessible to the system 316 and possibly multiple tenants, the program code 326 for implementing various functions of the system 316, and the process space 328 for executing MTS system processes and tenant-specific processes, such as running applications as part of an application hosting service. Additional processes that may execute on the system 316 include database indexing processes.

Several elements in the system shown in FIG. 3 include conventional, well-known elements that are explained only briefly here. For example, each of the user systems 312 could include a desktop personal computer, workstation, laptop, PDA, cell phone, or any wireless access protocol (WAP) enabled device or any other computing device capable of interfacing directly or indirectly to the Internet or other network connection. Each of the user systems 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of the user systems 312 to access, process and view information, pages and applications available to it from the system 316 over the network 314. Each of the user systems 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by the system 316 or other systems or servers. For example, the user interface device may be used to access data and applications hosted by the system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each of the user systems 312 and all of its components are operator configurable using applications, such as a browser, including computer code run using a central processing unit such as an Intel Pentium® processor or the like. Similarly, the system 316 (and additional instances of an MTS, where more than one is present) and all of their components might be operator configurable using application(s) including computer code to run using a central processing unit such as the processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring the system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, the system 316 is configured to provide webpages, forms, applications, data and media content to the user (client) systems 312 to support the access by the user systems 312 as tenants of the system 316. As such, the system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
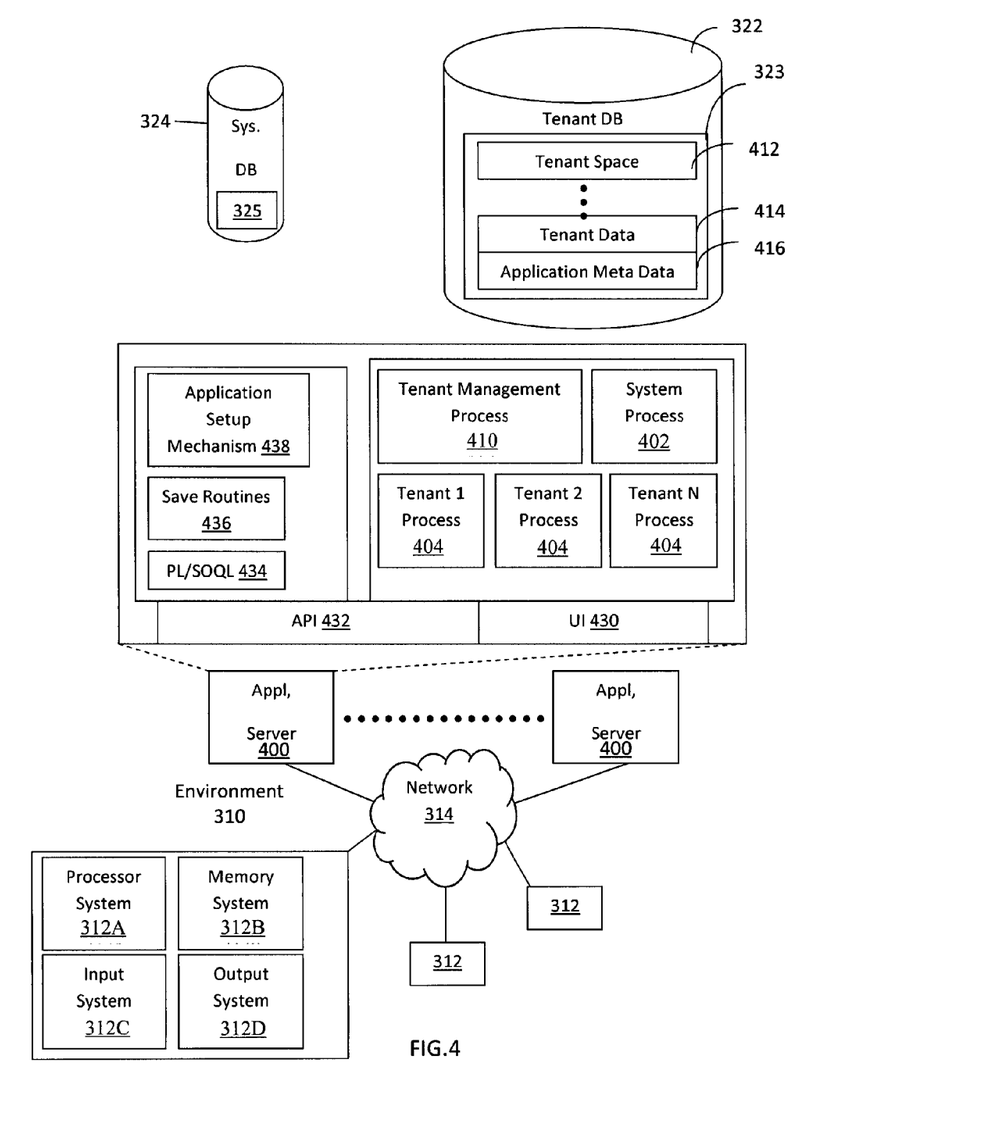
FIG. 4 illustrates a block diagram of an embodiment of elements of FIG. 3 and various possible interconnections between these elements.

FIG. 4 also illustrates the environment 310. However, in FIG. 4 elements of the system 316 and various interconnections in an embodiment are further illustrated. FIG. 4 shows that the each of the user systems 312 may include a processor system 312A, a memory system 312B, an input system 312C, and an output system 312D. FIG. 4 shows the network 314 and the system 316. FIG. 4 also shows that the system 316 may include the tenant data storage 322, the tenant data 323, the system data storage 324, the system data 325, a User Interface (UI) 430, an Application Program Interface (API) 432, a PL/SOQL 434, save routines 436, an application setup mechanism 438, applications servers 400₁-400N, a system process space 402, tenant process spaces 404, a tenant management process space 410, a tenant storage area 412, a user storage 414, and application metadata 416. In other embodiments, the environment 310 may not have the same elements as those listed above and/or may have other elements instead of, or in addition to, those listed above.

The user systems 312, the network 314, the system 316, the tenant data storage 322, and the system data storage 324 were discussed above in FIG. 3. Regarding the user systems 312, the processor system 312A may be any combination of one or more processors. The memory system 312B may be any combination of one or more memory devices, short term, and/or long term memory. The input system 312C may be any combination of input devices, such as one or more keyboards, mice, trackballs, scanners, cameras, and/or interfaces to networks. The output system 312D may be any combination of output devices, such as one or more monitors, printers, and/or interfaces to networks. As shown by FIG. 4, the system 316 may include the network interface 320 (of FIG. 3) implemented as a set of HTTP application servers 400, the application platform 318, the tenant data storage 322, and the system data storage 324. Also shown is the system process space 402, including individual tenant process spaces 404 and the tenant management process space 410. Each application server 400 may be configured to access tenant data storage 322 and the tenant data 323 therein, and the system data storage 324 and the system data 325 therein to serve requests of the user systems 312. The tenant data 323 might be divided into individual tenant storage areas 412, which can be either a physical arrangement and/or a logical arrangement of data. Within each tenant storage area 412, the user storage 414 and the application metadata 416 might be similarly allocated for each user. For example, a copy of a user's most recently used (MRU) items might be stored to the user storage 414. Similarly, a copy of MRU items for an entire organization that is a tenant might be stored to the tenant storage area 412. The UI 430 provides a user interface and the API 432 provides an application programmer interface to the system 316 resident processes to users and/or developers at the user systems 312. The tenant data and the system data may be stored in various databases, such as one or more Oracle™ databases.

The application platform 318 includes the application setup mechanism 438 that supports application developers' creation and management of applications, which may be saved as metadata into the tenant data storage 322 by the save routines 436 for execution by subscribers as one or more tenant process spaces 404 managed by the tenant management process 410 for example. Invocations to such applications may be coded using the PL/SOQL 434 that provides a programming language style interface extension to the API 432. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving the application metadata 416 for the subscriber making the invocation and executing the metadata as an application in a virtual machine.

Each application server 400 may be communicably coupled to database systems, e.g., having access to the system data 325 and the tenant data 323, via a different network connection. For example, one application server 400₁ might be coupled via the network 314 (e.g., the Internet), another application server 400N-1 might be coupled via a direct network link, and another application server 400N might be coupled by yet a different network connection. Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, the system 316 is multi-tenant, wherein the system 316 handles storage of, and access to, different objects, data and applications across disparate users and organizations.

As an example of storage, one tenant might be a company that employs a sales force where each salesperson uses the system 316 to manage their sales process. Thus, a user might maintain contact data, leads data, customer follow-up data, performance data, goals and progress data, etc., all applicable to that user's personal sales process (e.g., in the tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by the system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, the system 316 might also maintain system level data usable by multiple tenants or other data. Such system level data might include industry reports, news, postings, and the like that are sharable among tenants.

In certain embodiments, the user systems 312 (which may be client systems) communicate with the application servers 400 to request and update system-level and tenant-level data from the system 316 that may require sending one or more queries to the tenant data storage 322 and/or the system data storage 324. The system 316 (e.g., an application server 400 in the system 316) automatically generates one or more SQL statements (e.g., one or more SQL queries) that are designed to access the desired information. The system data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A system for identifying entities in semi-structured content, the system comprising:
   one or more processors; and
   a non-transitory computer readable medium storing a plurality of instructions, which when executed, cause the one or more processors to:
   identify a sequence of tokens in the semi-structured content based on assigning an information score to each token;
   assign, by a first layer of classifications that is executed by a machine learning model of a database system, an entity type for each token in the sequence of tokens based on an entity score representing a probability that the token corresponds to the entity type, the entity type being one of a plurality of entity types and the entity score being a maximum score for correspondence between the token and any of the plurality of entity types;

assign, by a second layer of classifications that is executed by the machine learning model, a structure score for each token in the sequence of tokens based on the token matching one of a plurality of structure types;

re-assign, by the second layer, the corresponding entity type and corresponding entity score for each token in the sequence of tokens matching one of the structure types;

assign, by a third layer of classifications that is executed by the machine learning model, a boundary type for each token in the sequence of tokens based on a boundary type score, the boundary type being one of a begin boundary type and a continue boundary type;

identify, by a fourth layer of classifications that is executed by the machine learning model, an entity based on: i) the entity type and the boundary type for each token, and; ii) the structure score for each token; and output the sequence of tokens as an identified set of entities based on the identified entity.

2. The system of claim 1, comprising further instructions, which when executed, cause the one or more processors to identifying contiguous tokens with collective information scores, which is higher than another information score for other contiguous tokens, as the sequence of tokens.

3. The system of claim 1, wherein assigning the entity type to each token in the sequence of tokens in the semi-structured content comprises identifying the sequence of tokens as corresponding to an entity type assigned to a last token of the token sequence of tokens.

4. The system of claim 1, wherein assigning a structure score to each token in the sequence of tokens is based on one of an email structure type, a phone structure type, and a website structure type, and wherein the boundary type for each token in the sequence of tokens is further based on the structure score for each token in the sequence of tokens.

5. The system of claim 1, comprising further instructions, which when executed, cause the one or more processors to merge adjacent tokens corresponding to a same entity type to generate a single compound entity type.

6. The system of claim 1, wherein the entity comprises a sequence of tokens from a same line of the semi-structured content.

7. A computer program product comprising a non-transitory computer-readable medium storing computer-readable program code which when executed by one or more processors, cause the one or more processors to:

identify, by a database system, a sequence of tokens in semi-structured content based on assigning an information score to each token;

assign, by a first layer of classifications that is executed by a machine learning model of the database system, an entity type for each token in the sequence of tokens based on an entity score representing a probability that the token corresponds to the entity type, the entity type being one of a plurality of entity types and the entity score being a maximum score for correspondence between the token and any of the plurality of entity types;

assign, by a second layer of classifications that is executed by the machine learning model, a structure score for each token in the sequence of tokens based on the token matching one of a plurality of structure types;

re-assign, by the second layer, the corresponding entity type and corresponding entity score for each token in the sequence of tokens matching one of the structure types;

assign, by a third layer of classifications that is executed by the machine learning model, a boundary type for each token in the sequence of tokens based on a boundary type score, the boundary type being one of a begin boundary type and a continue boundary type;

identify, by a fourth layer of classifications that is executed by the machine learning model, an entity based on: i) the entity type and the boundary type for each token, and; ii) the structure score for each token; and output, by the database system, the sequence of tokens as an identified set of entities based on the identified entity.

8. The computer program product of claim 7, wherein the program code comprises instructions to identify, by the database system, contiguous tokens with collective information scores, which is higher than another information score for other contiguous tokens, as the sequence of tokens.

9. The computer program product of claim 7, wherein assigning the entity type to each token in the sequence of tokens in the semi-structured content comprises identifying the sequence of tokens as corresponding to an entity type assigned to a last token of the sequence of tokens.

10. The computer program product of claim 7, wherein the program code comprises instructions wherein assigning a structure score to each token in the sequence of tokens is based on one of an email structure type, a phone structure type, and a website structure type, and wherein the boundary type for each token in the sequence of tokens is further based on the structure score for each token in the sequence of tokens.

11. The computer program product of claim 7, wherein the program code comprises instructions to merge, by the database system, adjacent tokens corresponding to a same entity type to generate a single compound entity type.

12. The computer program product of claim 7, wherein the entity comprises a sequence of tokens from a same line of the semi-structured content.

13. A computer-implemented method for identifying entities in semi-structured content in an on-demand database system, the method comprising:

identifying, by a database system, a sequence of tokens in the semi-structured content based on assigning an information score to each token;

assigning, by a first layer of classifications that is executed by a machine learning model of the database system, an entity type for each token in the sequence of tokens based on an entity score representing a probability that the token corresponds to the entity type, the entity type being one of a plurality of entity types and the entity score being a maximum score for correspondence between the token and any of the plurality of entity types;

assigning, by a second layer of classifications that is executed by the machine learning model of the database system, a structure score for each token in the sequence of tokens based on the token matching one of a plurality of structure types;

re-assigning, by the second layer, the corresponding entity type and the corresponding entity score for each token in the sequence of tokens matching one of the structure types;

assigning, by a third layer of classifications that is executed by the machine learning model of the database system, a boundary type for each token in the sequence of tokens based on a boundary type score, the boundary type being one of a begin boundary type and a continue boundary type;

identifying, by a fourth layer of classifications that is executed by the machine learning model of the database system, an entity based on: i) the entity type and the boundary type for each token, and; ii) the structure score for each token; and outputting, by the database system, the sequence of tokens as an identified set of entities based on the identified entity.

14. The method of claim 13, wherein the method further comprises identifying, by the database system, contiguous tokens with collective information scores, which is higher than another information score for other contiguous tokens, as the sequence of tokens.

15. The method of claim 13, wherein assigning the entity type to each token in the sequence of tokens in the semi-structured content comprises identifying the sequence of tokens as corresponding to an entity type assigned to a last token of the sequence of tokens.

16. The method of claim 13, wherein assigning, by the database system, a structure score to each token in the sequence of tokens is based on one of an email structure type, a phone structure type, and a website structure type, and wherein the boundary type for each token in the sequence of tokens is further based on the structure score for each token in the sequence of tokens.

17. The method of claim 13, wherein the method further comprises merging, by the database system, adjacent tokens corresponding to a same entity type to generate a single corresponding entity type.

* * * * *